UNITED STATES PATENT OFFICE.

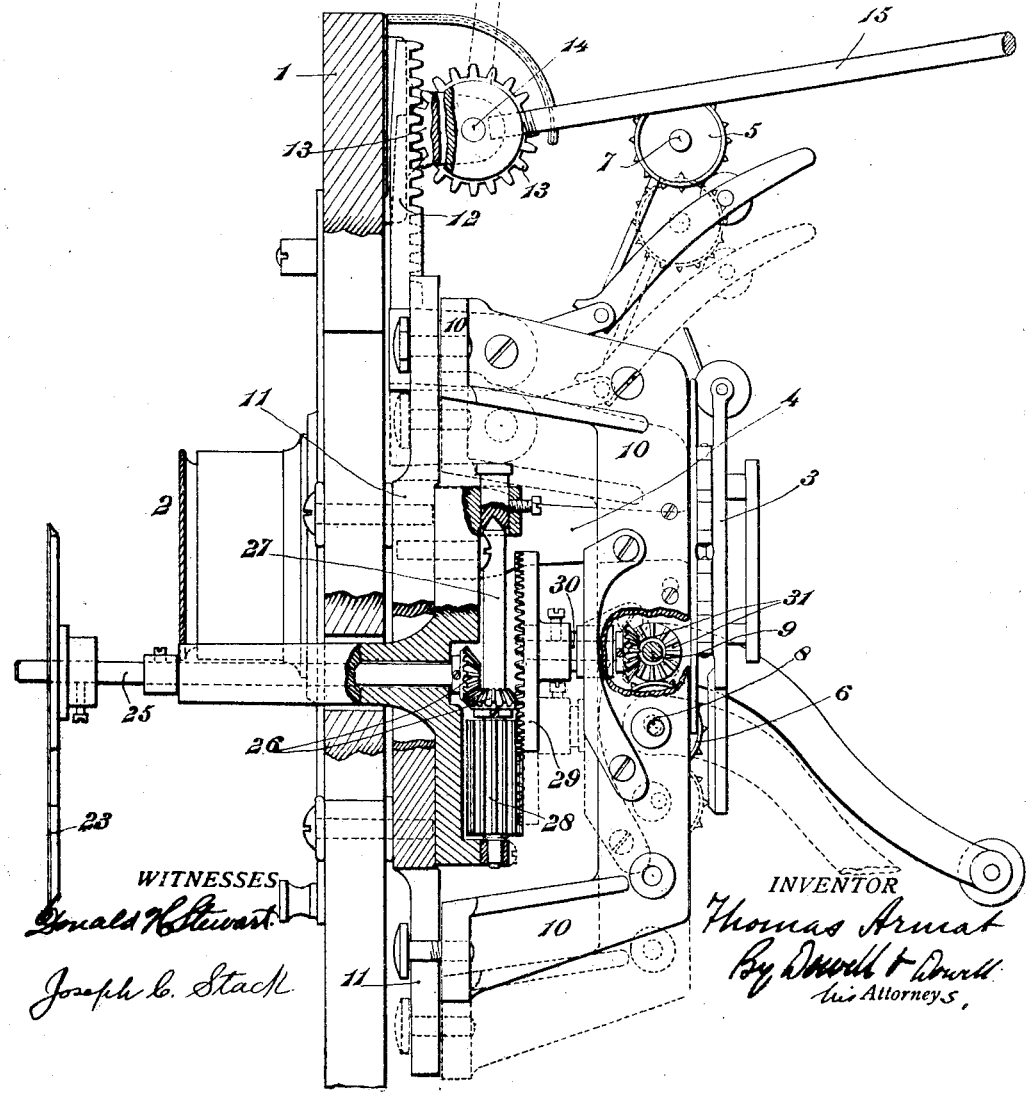

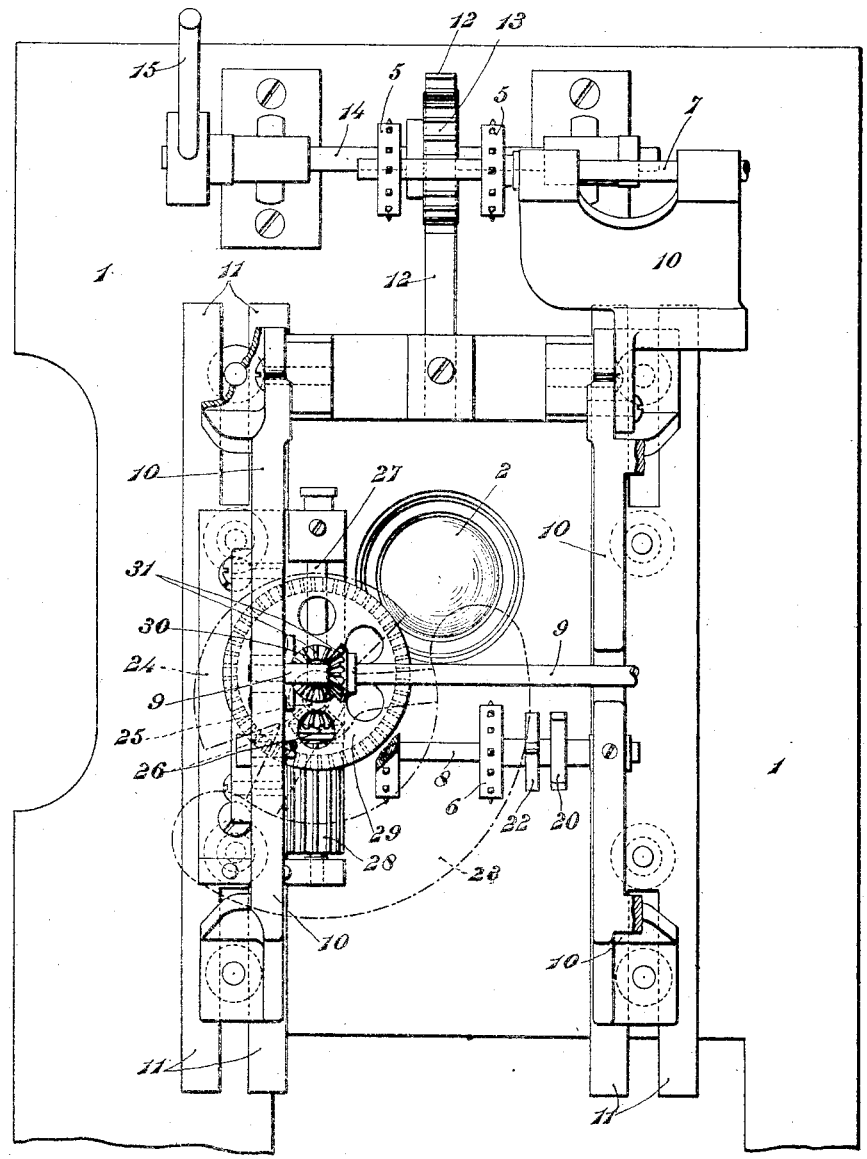

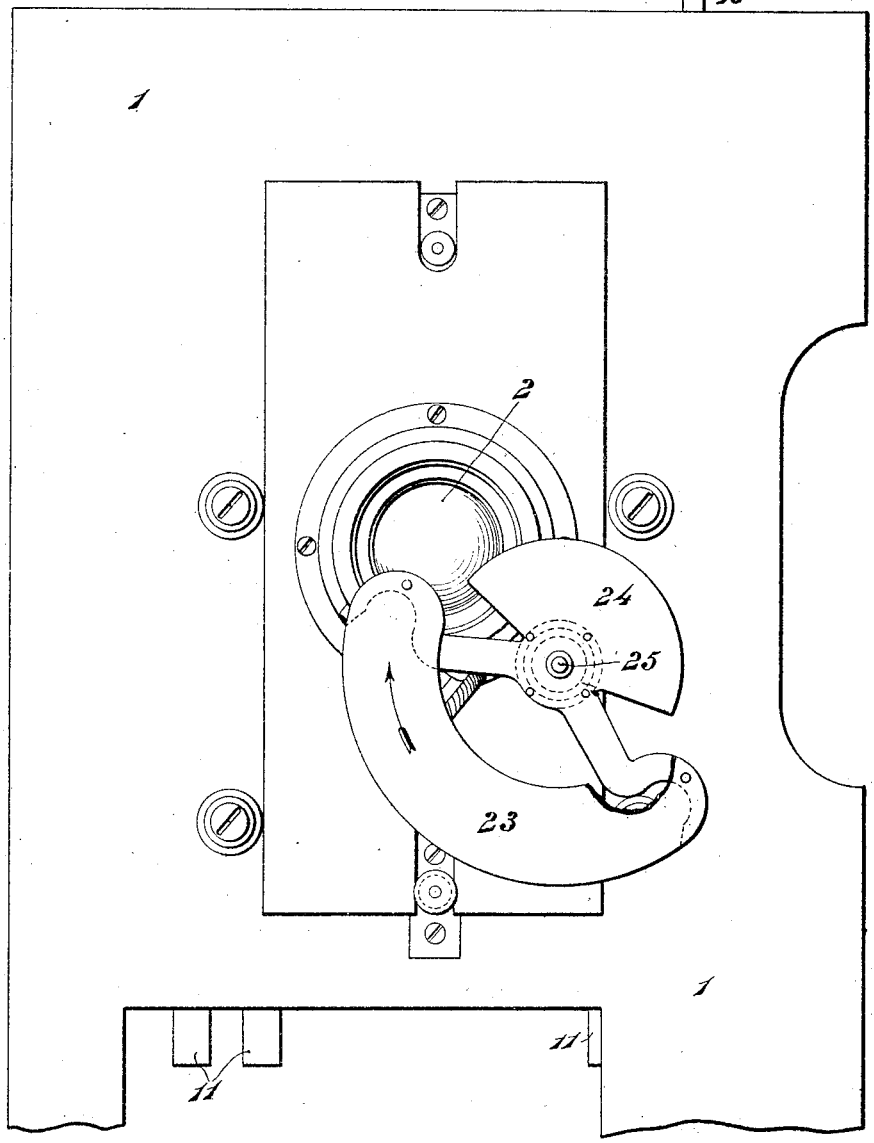

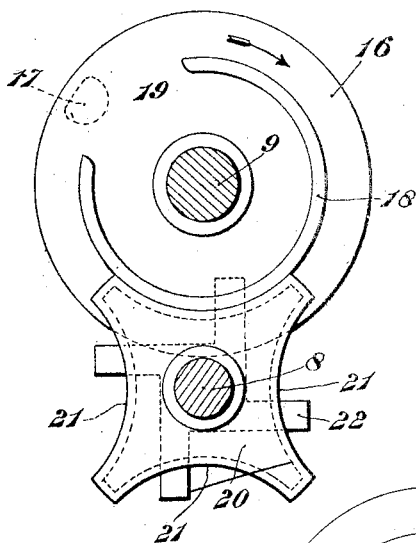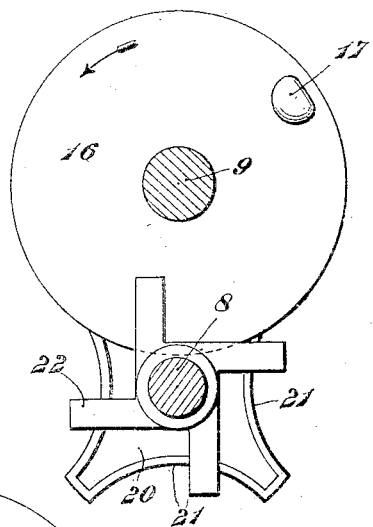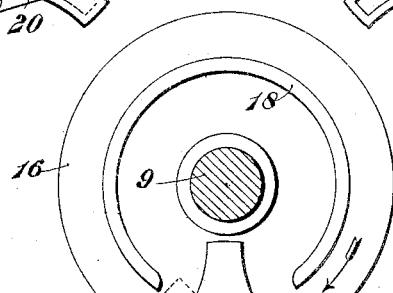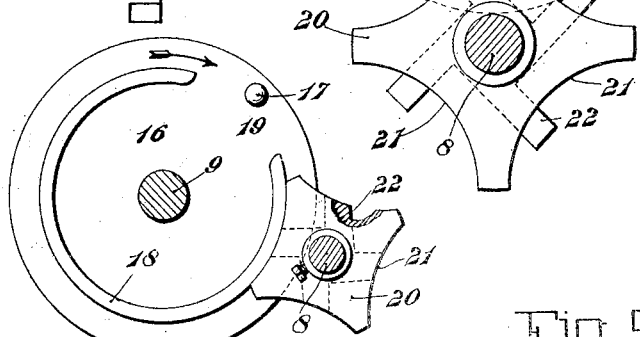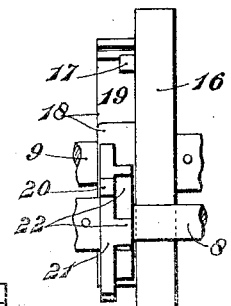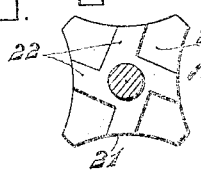

THOMAS ARMAT, OF WASHINGTON, DISTRICT OF COLUMBIA.

VITASCOPE.

1,259,066.  Specification of Letters Patent.  Patented Mar. 12, 1918.

Application filed April 18, 1910. Serial No. 556,180.

*To all whom it may concern:*

Be it known that I, THOMAS ARMAT, a citizen of the United States, residing at Washington, in the District of Columbia, have invented certain new and useful Improvements in Vitascopes, of which the following is a specification.

My invention relates to apparatus for exhibiting moving pictures.

A special object of my invention is to provide simple and efficient means for exhibiting pictures in such a way as to reduce the number of pictures necessary to be taken or exhibited in a given length of time to a minimum, yet without thereby producing the disagreeable scintillation or flicker such as would result from the exhibition of pictures taken at a low rate of speed upon machines that do not embody my improvements.

Another special object of the invention is to provide mechanism whereby the time occupied by the shutter in passing across the exposure opening both in shutting off and in exposing the picture is reduced to a minimum.

My invention also provides improved means whereby the timing of the shutter or device for intermittently obscuring the illumination will remain unaltered by the setting or adjustment of the picture relative to the exposure opening or focus of the objective lens.

The means by which I attain these and other objects are illustrated in the accompanying drawings, with reference to which the invention will be hereinafter described and then more particularly pointed out in the claims annexed to this specification.

In several patents heretofore issued to me for improvements relating to the moving-picture art, I have pointed out the advantages of exposing the successive pictures in the field of illumination for a comparatively long length of time and changing or substituting the pictures one for another in a very short period of time; the relatively prolonged periods of exposure and quick interruptions or changes producing the visual impression of an even continuous motion or lifelike effect by virtue of the optic faculty known as the persistence of vision. The mechanical means for intermittently moving the pictures in this way, now almost universally used in the art, is what is known as the "Geneva stop movement", and is described in my U. S. Patent No. 578,185. This mechanical movement as now generally applied gives an exposure to each picture as compared to the period of change of four or five to one. At this ratio the number of pictures necessary to be taken and exhibited in a given length of time, for satisfactory effects, is about sixteen pictures per second, which is the present commercial rate.

In order to reduce the rate of taking and exhibiting pictures in a practical manner and without sacrificing the even or lifelike visual effect, a mechanical movement is required that will largely increase the ratio of the time interval of rest or exposure to the period of movement or change; and for this purpose I have devised a mechanical movement which increases the relative period of exposure from four or five to one, to ten or twelve to one. Said mechanical movement is incorporated in the machine illustrated in the accompanying drawings as a suitable means for intermittently feeding the picture-bearing film in accordance with the purpose of my present invention.

The problem of reducing the number of pictures per second from the present rate of sixteen per second to about half that rate, is not however one of merely extending the period of rest and reducing the period of change. At a rate of exhibition as low as eight per second a new physiological condition presents itself, which is this. The normally sensitive eye appears to but slightly take cognizance of alternations of light and darkness; such as occur in moving picture exhibitions giving excess of illumination to each picture, when such alternations take place at a rate of about 32 per second; but when the alternations take place at a lower rate, a tiring of the muscles of the eye ensues, due to the effort of the pupil to adjust itself to changing conditions of light and darkness. The principal reason appears to be that at about 32 alternations of light and darkness per second, the pupil does not have time to dilate during the interval of absence of light before another light impulse is received. In other words the alternations of light and darkness occurring in the one-thirtieth of a second are too rapid for the pupil of the eye to appreciably respond to, where the light interval substantially exceeds the interval of darkness.

With such relative short periods of change as ten or twelve to one, the problem is presented of obtaining a shutter of the necessary capacity and rapidity to adequately mask the picture for the full period of its movement, yet without unnecessarily prolonging the interruption of illumination. In commercial machines heretofore employed in the art, it is almost the universal practice to employ a shutter making one complete revolution for each picture exhibited. Usually such shutters have a comparatively short throw and for this reason a considerable proportion of the total time of a complete revolution is occupied by the shutter in passing across the exposure opening both in shutting off the view and in exposing the picture. If the shutter is made wide enough to pass entirely across the exposure opening before the picture starts to move and also wide enough to reach entirely across the opening until the picture comes to a state of complete rest, it unnecessarily prolongs the period of change. If it is not made wide enough to do this, it will expose or partially expose the picture during a part of the period of its movement.

I have overcome the difficulty mentioned by providing a shutter which makes a number of revolutions to each picture exhibited and has a proportionally increased angular dimension. For example, where the period of change is only one-tenth or one-twelfth of the period of exposure, the shutter preferably makes four revolutions per exposure and has an angular dimension four times as great as its dimension would be for a shutter revolving only once per exposure. This gives the shutter sufficient angular measure to cover the exposure opening before the picture starts to move and until it has come to a state of complete rest, while at the same time the movement of the shutter across the exposure opening is so rapid as to reduce to a minimum the time employed to completely shut off and completely expose the picture. Moreover, I prefer to place this shutter in front of the lens at a point where the converging rays occupy the smallest space, which still further reduces the time occupied by the shutter in completely masking the picture and exposing it.

This passage of the shutter four times across the exposure opening to each picture, has the disadvantage of reducing the illumination, but it has compensating advantages, in pictures taken at a low rate, of breaking up the pulsations of light caused by the passage of the shutter into shorter intervals, which reduces the scintillation. Such a shutter does not shorten the period of exposure as compared to the period of change, the period of change being fixed by the time occupied by the shutter in masking the picture during its movement, and the passage of the shutter during the period of exposure does not operate to shorten the total time interval during which the picture is visible, but breaks it up by a series of interruptions into short pulsations too rapid for the eye to take cognizance of. The loss of the light is not a matter of serious consequence where there is an abundance of light such as is furnished by the electric arc.

Another feature of my invention is the provision of a shutter that does not have its timing altered in respect to the exposure opening by the setting of the picture. This setting of the picture in all machines of which I have knowledge is accompanied by an alteration in the distance between the exposure opening and the axis of the revolving shutter, which produces a difference in the timing of the shutter as it passes across the exposure opening. This has always been an objectionable feature and would be especially objectionable in the present instance by reason of the exceedingly short period of change and rapidity of movement of the shutter. I have overcome the objection by mounting the shutter on an axis fixed relative to the exposure opening and operable through a sliding gear by the driving mechanism of the machine, the latter being adjustable without changing the position of the axis of the shutter.

I will now describe the embodiment of my invention shown in the accompanying drawings, the same being illustrative of a suitable type of machine to which my invention is applicable.

Figure 1 is a side elevation of the machine, with parts broken away. The dotted lines indicate a lowered position of the film-feeding mechanism which is vertically-adjustable within approximately the limits represented by the full and dotted lines to permit setting of the picture relative to the lens or exposure opening.

Fig. 2 is a back view of the machine.

Fig. 3 is a front view thereof.

Fig. 4 is a side view of one form of my improved mechanical movement for intermittently feeding the film.

Fig. 5 is an opposite side view of the same.

Fig. 6 is a view of Fig. 4 after movement to another position.

Fig. 7 is a side view and Fig. 8 an end view of another form of such mechanical movement.

Fig. 9 is an opposite side view of the driven element of Fig. 7.

Fig. 10 is a side view of a modified form of tappet.

1 indicates an upright frame-plate or front member of the casing of a moving picture exhibiting apparatus; 2 is the objective lens; 3 is the holder for guiding and tensioning the picture-bearing film (not shown) across the exposure opening; and 4 is an arm attached to the frame plate and supporting said holder 3 in fixed relation to the lens. The said holder or guiding and tensioning device 3 (omitted from Fig. 2) has the usual opening for admitting light through the translucent flue from an illuminator (not shown) placed behind the film. 5 and 6 are the toothed drums for engaging the film, the former for paying out slack therein in advance of the exposure opening, and the latter for intermittently moving the film. 7 is the continuously driven shaft of the paying out drum 5, and 8 is the intermittently driven shaft of the feed-drum 6, which receives its motion from a continuously driven shaft 9 through the necessary mechanical movement. The driving crank or other means for operating the machine, and the gearing for transmitting motion to the shafts 7 and 9 are not shown. The operating mechanism is or may be vertically adjustable in the usual manner to permit setting the picture relative to the exposure opening, said mechanism being mounted in a frame 10 movable up and down on vertical guides 11 attached to the frame-plate 1; said frame 10 having a rack-bar 12 engaged by a pinion 13 on a shaft 14 provided with a handle 15 for raising and lowering the mechanism. The full and dotted lines in Fig. 1 indicate approximately the extreme upper and lower positions of the mechanism.

It is deemed unnecessary to describe more fully the foregoing parts of the illustrated machine, which are well understood in the art. The parts embodying my present improvements, and by means of which the aforesaid novel results are effected, will now be set forth.

First, it may be repeated that I employ a mechanical movement for intermittently feeding the film in such manner as to largely increase the ratio of the time interval of rest or exposure to the period of movement or change, as compared with the ratio of rest to change in the commonly used Geneva stop movement; and I also employ means to obscure the illumination a plurality of times for each exposure, certain periods of interruption of the light coinciding with the period of change or substitution of one picture for another.

A mechanical movement which I have devised for the purpose stated is represented in detail in Figs. 4 to 10. It comprises, first, a driving wheel or element 16, on shaft 9, having a lateral stud or pin-like projection 17, and a lateral circular flange or ring-like projection 18 which is less than a circle and leaves a gap 19; second, a driven wheel or element 20, on shaft 8, having concave depressions or surfaces 21 in its periphery; and third, a multiple-arm tapet 22 beside the driven element, either fast on the same shaft therewith (Figs. 4 to 6), or made as an integral part thereof (Figs. 7 to 9); the arms of the tappet being preferably four in number, corresponding to the number of concave depressions in the driven gear. The circular flange 18 of the driving wheel is adapted to coact with the concave surfaces or depressions 21 of the driven element to lock the latter and hold it stationary; and the pin or stud 17 is adapted intermittently to coact with the tappet 22 and thereby turn the driven element, during which movement the portion of the driven element which extends between its concaves 21 enters the gap 19 in said flange 18. In Figs. 4 to 6 the driven gear and tappet are separate elements and the stud 17 and flange 18 are placed on opposite sides of the driving wheel; while in Figs. 7 to 9 the tappet is an integral part of the driven gear and the stud and flange are on the same side of the driving wheel; otherwise the construction in both cases is substantially the same except that in Figs. 7 to 9 the arms of the tappet do not project beyond the perimeter of the driven gear, as in the first illustrated construction, and those portions of the driven gear which extend between its concaves are shorter, the parts being brought nearly together and the leverage increased. Fig. 10 shows the arms of the tappet beveled or inclined in the direction of movement of the stud 17, which alters the relative period of movement and rest. These alternative constructions being represented to show how modifications in the details of the gearing may be made to affect the relative timing. In operation, as the driving wheel 16 revolves in the direction indicated by the arrows, the projection or stud 17 will at each revolution contact with an arm of the tappet 22 and give the driven element a quick quarter turn, during which movement the portion of the driven element which extends between adjacent concaves enters the gap 19 in the flange 18; and the instant the tappet arm is released by the stud 17 the circular flange 18 will have engaged a concave depression 21 in the driven element so as to lock and hold the same stationary while the driving wheel completes its revolution; and thereupon when the gap 19 again comes to position to release the driven gear the stud 17 will engage the next tappet-arm, and so on, intermittently imparting a quick partial rotation to the driven element.

As stated at the outset, the mechanical movement above described gives a relative period of rest or exposure as compared to the period of change of from ten to one, to twelve to one. Such a ratio is rendered possible by the fact that the stud or projection 17 of the driving element operates on the driven element near the axis of rotation of the latter, and said projection does not engage or contact with the driven element until it has passed beyond the approaching point of the locking surface of the driven element, or until the locking surface of the driving element has reached a position where the driven element is free to turn a complete part rotation. In the almost universally used Geneva stop movement, such as shown in Fig. 6 of the drawings of my Patent No. 578,185, where the driven gear or element consists of a star-wheel having radial slot-ways between its concave locking surfaces, which slot-ways are successively engaged by a lateral pin on the driving wheel, the driven gear or star-wheel begins to rotate as soon as said pin begins to enter a slot-way in the star-wheel, and the movement continues until the pin has cleared the slot. In my present improvement, the driven element has no slot-ways and the projection on the driving element which comes in contact with the tappet can be made to bear any desired relation to the locking surfaces of the driven element, so as to largely increase the speed and interval of motion as compared to the interval of rest; as the projection on the driving element does not begin to rotate the driven element until it contacts therewith at a point near the axis of rotation and quickly turns the arm of the tappet with which it contacts so as to pass clear thereof, whereby the period of movement is shortened and the period of rest greatly prolonged, as compared with the previous movement.

Owing to the brief period of movement or change, which is only one-tenth or one-twelfth of the time of one rotation of the drive shaft (9), the period of shutter obstruction must be shortened in accordance with the period of change, without sacrificing the masking ability of the shutter; and as aforesaid I accomplish this result by employing a shutter of increased angular dimension and causing the shutter to make a number of revolutions per exposure. The increased angular dimension of the shutter does not affect the period of change since it is offset by the rapidity of movement. It is preferable to have the shutter make four revolutions per exposure. As before noted, the rapid passage of the shutter at such shorter intervals reduces the scintillation but does not shorten the total time interval during which the picture is visible but breaks it up by a series of interruptions into short pulsations too rapid for the eye to note.

By this method while there are thirty-two obstructions or alternations of light and darkness per second, only eight of these occur during the interval of change, each picture being in a state of complete rest during three obstructions.

The eye is therefore relieved by this method of much of the fatigue due to the effort to hold on to one impression until the next is recorded.

In the drawings 23 denotes the shutter, 24 a counterweight and 25 the shutter shaft. The shutter 23 is preferably in the form of a segment, of less transverse width than the diameter of the lens, and is placed in front of the lens at a position where the converging rays occupy the smallest space, which as before stated reduces the time occupied by the shutter in completely masking and uncovering the picture. While some scattered or diffused rays of light will pass margins of the shutter, this is rather an advantage, and the shutter intercepts the effective rays which is all sufficient for obstruction purposes during the change of the picture. On the other hand, the sector shaped counterweight 24 may have such a radius as to move across the margin of the lens, but this is immaterial as the counterweight will not intercept the effective rays. The shutter shaft 25 is or may be driven through beveled gears 26 from a transverse shaft 27, the latter being provided with an elongated pinion 28 which is slidably engaged by a crown wheel or face gear 29 on stud shaft 30, said shaft 30 being driven through beveled gears 31 from the drive shaft 9. The ratio of the crown wheel 29 to the pinion 28 is four to one in this instance, to give the desired timing to the shutter.

In all prior machines of which I have knowledge, the shutter shaft is geared with the drive shaft, and hence where provision is made for setting the picture relative to the exposure opening by adjustment of the operating mechanism, the shutter shaft shifts with the drive shaft and causes an alteration in the distance between the center of the lens and the axis of the shutter with a consequent difference in the timing or period of the shutter obstruction. In the present improved construction, by interposing a sliding gearing between the drive shaft and shutter shaft, the shutter shaft 25 and transverse shaft 27 are stationary, and, when the operating mechanism is adjusted by the lever 15 to set the picture relative to the exposure opening, the crown wheel 29 slides up and down on the elongated pinion 28 without changing the axis of the shutter or affecting its timing.

I find that by means of these improvements it is possible to take and exhibit pictures at just one-half the present commercial rate of about sixteen pictures per second, which means an economy of fifty per cent., in both taking and exhibiting pictures. The wear upon the films by virtue of the fewer changes per second is also greatly reduced, probably fifty per cent., making in all an economy of seventy-five per cent.

I claim as my invention and desire to secure by Letters Patent:

1. In a motion picture projecting apparatus, the combination with a picture strip having thereon a consecutive series of photographs of successive phases of a moving object, taken at considerable intervals of time, i. e. at approximately the rate of eight per second, of a source of illumination, a projecting lens, means for periodically advancing the picture strip and for holding each succeeding picture in position to be projected, the length of the periods of rest and motion being in substantially the ratio of ten to one, and a shutter positively geared to the picture advancing mechanism so as to make not less than four revolutions to each picture exhibited and adapted to intercept the light at each revolution, once during each period of picture movement and not less than three times during each period of picture rest, said shutter having its angular dimensions increased to compensate for its relative speed of rotation so as to completely obscure the picture during its period of movement, whereby a picture strip of about one-half the usual length and having one-half the usual number of pictures thereon may be successfully employed for portrayal on a screen of an extended scene including moving objects without objectionable scintillation, substantially as described.

2. The improvement in the art of exhibiting pictures of objects in motion by projecting the pictures on a screen through the medium of a beam of light, which consists in periodically interrupting the light at a rate more rapid than that to which the eye of the observer can respond, i. e. approximately thirty-two per second; in presenting the pictures successively in position for projection at a relatively slow rate, i. e. approximately eight per second, and in moving the pictures into and out of position for projection at such speed that the period of movement will take but approximately one-tenth as long as the period of exposure, i. e. approximately one-eightieth of a second, each period of movement being timed to occur during a period of light interruption, whereby the number of pictures necessary to successfully represent a given movement of an object is reduced to the minimum without creating objectionable scintillation.

In testimony whereof I affix my signature, in presence of two witnesses.

THOMAS ARMAT.

Witnesses:
CHAS. E. RIORDON,
OSGOOD H. DOWELL.

Copies of this patent may be obtained for five cents each, by addressing the "Commissioner of Patents, Washington, D. C."